United States Patent Office 2,839,495
Patented June 17, 1958

2,839,495

PROCESS FOR RESINIFYING POLYEPOXIDES AND RESULTING PRODUCTS

James E. Carey, Maplewood, N. J., assignor to Shell Development Company, New York, N. Y., a Delaware corporation No Drawing. Application November 7, 1955
Serial No. 545,541

20 Claims. (Cl. 260—47)

This invention relates to a process for resinifying polyepoxides. More particularly, the invention relates to a new process for resinifying polyepoxides with acid anhydrides using a special class of activators for the acid anhydrides, and to the resulting cured products.

Specifically, the invention provides a new process for resinifying polyepoxides, and preferably glycidyl polyethers of polyhydric phenols and polyhydric alcohols, which comprises mixing and reacting the polyepoxide with an acid anhydride and an activator for the anhydride comprising a $BF_3$ complex, and preferably a product of $BF_3$ and an amine or a product of $BF_3$ and a phenol. The invention further provides cured products obtained by the above-described process.

It is known that acid anhydrides may be used by themselves as curing agents for polyepoxides, such as the glycidyl polyethers of polyhydric phenols. These curing agents, however, have certain undesirable properties which have placed a considerable limitation on their commercial utilization. It has been found, for example, that the acid anhydrides show little activity in the cure of the polyepoxides at room temperature or at slightly elevated temperatures and are effective only at very high temperatures. This prevents their use in the preparation of compositions that are to be cured at room temperature or compositions that might be injured by the high temperatures. Even at the high reaction temperatures, the anhydrides in many cases act very slowly and they are unable to be used in compositions which must be cured rapidly. Furthermore, the products obtained by the use of the anhydrides are sometimes deficient, particularly as to hardness and durability.

It is an object of the invention to provide a new method for resinifying and curing polyepoxides. It is a further object to provide a new process for curing polyepoxides to form cross-linked products using acid anhydrides and a special class of activators for the anhydrides. It is a further object to provide a new process for resinifying polyepoxides with anhydrides that gives the desired product in a much shorter period of time. It is a further object to provide a new process for resinifying polyepoxides with acid anhydrides that gives the desired cure at room temperature in a short period. It is a further object to provide a process for resinifying polyepoxides that gives a rapid rate of cure at elevated temperatures. It is a further object to provide a method for resinifying polyepoxides that gives cured products having improved properties. These and other objects of the invention will be apparent from the following detailed description thereof.

It has now been discovered that these and other objects are accomplished by the process of the invention comprising mixing and reacting the polyepoxide with an acid anhydride and an activator for the anhydride comprising a $BF_3$ complex, and preferably a product of $BF_3$ and an amine or a product of $BF_3$ and a phenol. It has been found that when the anhydrides are used in combination with the above-noted activators they display surprisingly high activity as curing agents for the polyepoxides, and particularly for those having terminal epoxy groups such as the glycidyl polyethers of the polyhydric phenols and polyhydric alcohols, over a wide range of temperatures. This combination, for example, can be used to cure polyepoxides at or near room temperature. At the higher temperatures, the combination of anhydride and activator gives a very rapid rate of cure and is particularly suited for use in the preparation of rapid cure high temperature surface coatings. Additional advantage is also found in the fact that the products obtained by the use of the activators are improved in hardness and durability over the anhydride cured products.

The acid anhydrides used as the curing agent in the process of the invention may be any anhydride which is derived from a polycarboxylic acid and possesses at least one anhydride group, i. e., a

The carboxylic acids used in the formation of the anhydrides may be saturated, unsaturated, aliphatic, cycloaliphatic, aromatic or heterocyclic. Examples of these anhydrides include among others, phthalic anhydride, isophthalic anhydride, di-, tetra-, and hexahydrophthalic anhydride, 3,4,5,6,7,7-hexachloro-3,6-endomethylene 1,2,4,5-tetrahydrophthalic anhydride (chlorendic anhydride), succinic anhydride, maleic anhydride, chlorosuccinic anhydride, monochloromaleic anhydride, 6-ethyl, 4-cyclohexadiene-1,2-dicarboxylic acid anhydride, 3,6-dimethyl-4-cyclohexadiene-1,2-dicarboxylic acid anhydride, 6-butyl-3,5-cyclohexadiene-1,2-dicarboxylic acid anhydride, octadecylsuccinic acid anhydride, dodecylsuccinic acid anhydride, dioctyl succinic anhydride, nonadecadienylsuccinic anhydride, 3-methoxy-1,2,3,6-tetrahydrophthalic acid anhydride, 3-butoxy-1,2,3,6-tetrahydrophthalic anhydride, pyromellitic anhydride, di-, tetra- and hexahydropyromellitic anhydride, polyadipic acid anhydride, polysebacic acid anhydride, and the like and mixtures thereof.

Preferred anhydrides to be employed in the process comprise the aliphatic, cycloaliphatic and aromatic mono- and dianhydrides (i. e., those possessing two of the above-noted anhydride groups such as pyromellitic anhydride), and the chlorinated derivatives of the aforedescribed mono- and dianhydrides. Especially preferred are the normally liquid or low melting anhydrides, such as hexahydrophthalic anhydride.

The activators for the anhydrides comprise $BF_3$ complexes, and particularly the complexes of boron trifluoride and compounds of the group consisting of phenols and organic compounds having at least one nitrogen atom which does not have a negative group attached thereto. The phenolic compounds may be mono- or bis-phenol, resorcinol, catechol, 2,2-bis(4-hydroxyphenyl)butane and the like. The nitrogen compound can be, for example, a primary, secondary or tertiary aliphatic amine, such as methylamine, dimethylamine, trimethylamine, 2-ethylhexylamine, stearylamine, allylamine, monoethanolamine, diethanolamine, triethanolamine, monoisopropanolamine, diisopropanolamine, triisopropanolamine, ethylenediamine, triethylenetetraamine, tetraethylenepentamine, aminoethylethanolamine, etc.; aromatic amines, such as o-phenylenediamine, m-phenylenediamine, p-phenylenediamine, o-toluidine, m-toluidine, p-toluidine, benzylamine, methylaniline, diphenylamine, triphenylamine, etc., pyridine, compounds having condensed pyridine rings, and their homologs and other derivatives, for example, alpha-picoline, beta-picoline, gamma-picoline, the lutidines, such as 2,6-lutidine, the collidines, 2-ethanolpyridine, 4-ethanolpyridine, 2-hexylpyridine, 2-propanolpyridine, 4-propanolpyridine, 2-vinylpyridine, quinoline, isoquinoline, quinaldine, lepidine, etc., aminopyridines and homologs thereof, for example, 2-amino-3-methylpyridine, 2-amino-6-methylpyridine, 2-aminopyridine, etc.; cycloalkylamines, for example, cyclohexylamine, and dicyclohexylamine; piperidine; etc.

The $BF_3$ complexes may be prepared by conventional methods. The $BF_3$ amine complexes, for example, may be prepared by passing $BF_3$ gas over or into a solution containing the amine, or they may be prepared by adding the amine dropwise to a reaction flask containing $BF_3$ etherate and excess ether while keeping the mixture at a temperature of about 35° C. and after the reaction has subsided, removing the excess ether.

The preparation of some of the $BF_3$ amine complexes is shown below.

$BF_3$ TRIETHYL AMINE

One mole of triethyl amine was added dropwise with stirring to a solution of 1 mole of $BF_3$ etherate diluted with excess diethyl ether at −20° C. The addition complex crystallized out of solution and was separated by filtration and washed with cold ether.

$BF_3$ DIMETHYL BENZYL AMINE

Thirty-four parts of dimethyl benzyl amine was dissolved in 25 parts of petroleum ether and agitated while $BF_3$ gas was passed over the surface. The temperature was kept below 15° C. by cooling. After four hours, 21.5 parts of a white powder were recovered by filtration.

$BF_3$ DIMETHYL ANILINE 60.5 g. (½ mol) of dimethyl aniline was stirred at a temperature of 10–20° C. while $BF_3$ gas was intermittently passed over the surface for 4½ hours. The resulting solid complex had a light green color.

$BF_3$ ETHYL ANILINE $BF_3$ gas was bubbled into ethyl aniline at room temperature. When the $BF_3$ gas began to be given off in copious quantities, the addition was stopped and light vacuum applied. Resulting product was a viscous liquid complex of $BF_3$ and ethyl aniline.

$BF_3$ TRIMETHYL AMINE

Five parts of trimethyl amine were condensed in 110 parts of petroleum ether cooled to −50° C. $BF_3$ gas was added to this solution at a temperature below 6° C. until addition of further $BF_3$ resulted in no temperature rise. The white solid which had formed was filtered on a Buchner funnel and washed with cold petroleum ether.

$BF_3$ TRIPROPYL AMINE 72.5 g. (½ mol) of tripropyl amine were dissolved in 50 g. of petroleum ether (B. P. 25–65° C.). $BF_3$ gas was passed intermittently over the surface of the solution, which was agitated and cooled externally with ice to keep the temperature down below 6° C. After three hours, the white crystalline solid was filtered off, washed twice with petroleum ether and air dried.

$BF_3$ LAURYL AMINE 185 parts of lauryl amine was dissolved in 100 parts of toluene and treated with $BF_3$ gas at a temperature below 13° C. The complex was precipitated by the addition of petroleum ether.

$BF_3$ AMMONIA 200 parts of $BF_3$-diethyl ether complex (45 percent $BF_3$) and 200 parts of diethyl ether were agitated in a container and $NH_3$ gas was passed over the surface. The product was filtered and occluded gases removed by heating at 50° C. under vacuum. The product so obtained had a melting point above 250° C.

$BF_3$ PHENYLHYDRAZINE 75 parts of phenylhydrazine was dissolved in 200 parts of benzene and $BF_3$ gas was passed through until the reaction was complete. A white solid was recovered as the product.

$BF_3$ HEXANOLAMINE 50 parts of hexanolamine was placed in 200 parts of benzene. Boron trifluoride gas was passed through the solution with stirring until the reaction was complete. The crude product was a sticky material resembling diethylenetriamine-boron trifluoride in its appearance. The hexanolamine-boron trifluoride is soluble in butyl "Carbitol," acetone, methyl ethyl ketone, and water.

$BF_3$ DIETHYLENE TRIAMINE 151 parts (1 mole) of boron trifluoride ether solution was placed in 200 parts of diethyl ether. 34 parts (½ mole) of diethylenetriamine in 70 parts of diethyl ether was then added slowly. The product separated as a gummy mass which became hard after the solvent escaped by air drying. The product was soluble in pyridine, methyl "Cellosolve," and water, being difficultly soluble in alcohol and methyl ethyl ketone. It could not be recrystallized. The melting point of the crude material was above 200° C.

$BF_3$ n-BUTYL AMINE 75 parts (½ mole) of boron trifluoride ether complex was added to 150 parts of diethyl ether. A solution of 36.5 parts of mono-n-butyl amine in 100 parts of diethyl ether was then very gradually added to this mixture with continued stirring. Upon filtering and drying, a white crystalline product was obtained.

$BF_3$ AMYLAMINE 87 parts (one mole) of amyl amine was dissolved in 200 parts of diethyl ether and 151 parts (one mole) of boron trifluoride-ether complex was added thereto very gradually with stirring. The solution was cooled and filtered and a white crystalline product was obtained.

$BF_3$ DECYLAMINE 75 parts (½ mole) of $BF_3$-ether complex was added to 150 parts of diethyl ether, and a solution of 78 parts (1 mole) of decyl amine in 100 parts of diethyl ether was added thereto with stirring. On cooling and filtering, a yellow solid wax was obtained.

$BF_3$ ANILINE 100 parts of aniline dissolved in 400 parts of benzene were placed in a 1-liter round bottom flask. Dry boron trifluoride gas was bubbled into the benzene solution, and the resulting crystals removed by filtration.

$BF_3$ MORPHOLINE

Eighty-seven parts (1 mole) of morpholine was stirred while 151 parts (1 mole) of a $BF_3$-ether complex (45 percent $BF_3$) in 100 parts of ethyl ether was added dropwise. On cooling the reaction mixture, an orange-yellow solid separated. The complex was washed with dry ethyl ether. It was insoluble in methyl ethyl ketone.

$BF_3$ BENZYL ANILINE

To a solution of 286 parts of benzyl aniline in 155 parts of anhydrous ether was added dropwise 200 parts of $BF_3$-ether complex (45 percent $BF_3$). The yellow precipitate was separated by filtration. This complex melted at 125–155° C. with decomposition.

$BF_3$ PYRIDINE

Sixty-nine parts (1 mole) of pyridine was stirred while 151 parts (1 mole) of $BF_3$-ether complex was added dropwise. The reaction was exothermic and the reaction mixture was cooled to aid precipitation of the complex. The white crystals which separated were collected on a filter and air dried.

According to the process of the invention, the polyepoxide is cured by admixing the above-described anhydrides and activators with the polyepoxide. The amount of the anhydride to be used in the process will vary over a wide range. Good cures are obtained by reacting the polyepoxide with at least .8 equivalent of the anhydride. As used herein in relation to the amount of anhydride and polyepoxide, the expression "equivalent" amount refers to that amount of anhydride needed to furnish one anhydride group for every epoxy group in the polyepoxide to be involved in the cure. To obtain the best results, the anhydride should be employed in about at least a chemical equivalent amount, and more preferably in equivalent ratio of 1:1 to 1.5:1.

The activators, i. e., the addition products of $BF_3$ are needed only in very small amounts. Excellent results are obtained when the activator is utilized in amounts varying from .01% to 10% by weight of the resin, i. e., resin containing both polyepoxide and anhydride, and more preferably in amounts varying from 0.1% to 2% by weight of the resin.

The anhydride and activator may be combined together before they are added to the polyepoxide or they may be added separately.

In executing the process of the invention, it is desirable to have the polyepoxide in a mobile liquid condition when the anhydrides and activator are added in order to facilitate mixing. With those polyepoxides that are liquid, but too viscous for ready mixing, one may either heat to reduce viscosity, or have a liquid solvent added thereto in order to provide fluidity. Normally solid polyepoxides are likewise either melted or mixed with a liquid solvent. Various solvents are suitable for achieving the desired fluidity. They may be volatile solvents which escape from the polyepoxide composition containing the anhydride activator mixture by evaporation before or during the curing, such as ketones like acetone, methyl ethyl ketone, methyl isobutyl ketone, isophorone, etc., esters such as ethyl acetate, butyl acetate, Cellosolve acetate (ethylene glycol monoacetate), methyl Cellosolve acetate (acetate of ethylene glycol monomethyl ether), etc.; chlorinated hydrocarbons such as trichloropropane, chloroform, etc. Solvents which remain in the cured composition may also be used, such as diethyl phthalate, dibutyl phthalate, or liquid monoepoxy compounds, including glycidyl allyl ether, glycidyl phenyl ether, styrene oxide, 1,2-hexylene oxide, glycide, and the like, as well as cyano-substituted hydrocarbons, such as acetonitrile, propionitrile, adiponitrile, benzonitrile, and the like. It is also convenient to employ the solid or semi-solid polyepoxides in combination with a liquid polyepoxide, such as a normally liquid glycidyl polyether of a polyhydric alcohol. Various other ingredients may be mixed with the polyepoxide composition including pigments, fillers, dyes, plasticizers, resins, and the like.

The cure may be effected over a wide range of temperatures. As indicated, may of the above-described anhydride-activator combination are active near room temperature, e. g., at about 15° C. to 20° C., and the cure may be accomplished by merely mixing the anhydride-activator combination with the polyepoxide as indicated above and then letting the mixture stand at room temperature. In some applications, it may be desirable to effect a more rapid cure and this may be accomplished by raising the temperature. Excellent rates of cure are obtained at temperatures from 50° C. to 200° C. and these are preferred for many applications where heating is permissible. Temperatures much above 200° C. are generally not desirable but may be employed if necessary.

The curing agent-polyepoxide systems described above may be utilized for a great variety of important applications. Because of their low temperature cure properties, they are particularly useful in the preparation of room temperaure cure coating compositions, and because of their rapid high temperature cures are useful in the formation of baking enamels. In these applications, it is generally desirable to combine the polyepoxide with the anhydride and activator and desired solvents or other film-forming materials, and then apply this mixture to the surface to be coated. The coatings may then be allowed to set at room temperature or heat may be applied.

The systems described above are also very useful in the preparation of electrical pottings and castings. They are particularly suitable for preparing very large castings as can be cured at low temperatures without liberation of large amounts of heat and this gives a more even cure which results in much stronger and more durable products. In this application, the mixture of polyepoxide, anhydride and activator alone or with suitable diluents is added to the desired mold or casting and then allowed to set at room temperature. Heat may be applied in some cases to hasten cure.

The above-described systems are also useful in the preparation of laminates. In this application, the sheets of fibrous material are first impregnated with the mixture of polyepoxide, anhydride and activator. This is conveniently accomplished by dissolving the anhydride and activator in acetone and mixing the solution with the polyepoxide so as to obtain a fluid mixture. The sheets of fibrous material are impregnated with the mixture by spreading it thereon or by dipping or otherwise immersing them in the impregnant. The solvent is conveniently removed by evaporation and the mixture is cured to the fusible resin state. Although this operation may be conducted at room temperature (20 to 25° C.), it is preferred to use somewhat elevated temperature such as about 50° C. to 200° C. with the impregnated sheet stock passing through or hanging free in an oven or other suitable equipment. The resinification is arrested before infusible product occurs by cooling below about 40° C. A plurality of the impregnated sheets are then superposed and the assembly is cured in a heated press under a pressure of about 25 to 500 or more pounds per square inch. The resulting laminate is extremely strong and resistant against the action of organic and corrosive solvents. The fibrous material used in the preparation of the laminates may be of any suitable material, such as glass cloth and matting, paper, asbestos paper, mica flakes, cotton batts, duck muslin, canvass and the like. It is usually preferred to utilize woven glass cloth that has been given prior treatment with well known finishing or sizing agents, therefor, such as chrome methacrylate or vinyl trichlorosilane.

In the above applications, the resulting cured products are characterized by their hardness and durability as well as by lack of discoloration which accompanies many of the other anhydride cured systems.

The polyepoxides to be cured by use of the above process are those possessing at least two

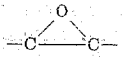

groups. These groups may be terminal, i. e.,

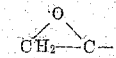

groups or they may be in an internal position. Preferably the epoxy groups are terminal. The polyepoxides may be saturated or unsaturated, aliphatic, cycloaliphatic, aromatic or heterocyclic and may be substituted if desired with substituents, such as chlorine atoms, hydroxyl groups, ether radicals and the like. They may also be monomeric or polymeric.

For clarity, many of the polyepoxides and particularly those of the polymeric type will be described throughout the specification and claims in terms of epoxy equivalent value. The meaning of this expression is described in U. S. 2,633,458.

If the polyepoxide material consists of a single compound and all of the epoxy groups are intact, the epoxy equivalency will be integers, such as 2, 3, 4 and the like. However, in the case of the polymeric type polyepoxides many of the materials may contain some of the monomeric monoepoxides or have some of their epoxy groups hydrated or otherwise reacted and/or contain macromolecules of somewhat different molecular weight so the epoxy equivalent values may be quite low and contain fractional values. The polymeric material may, for example, have epoxy equivalent values, such as 1.5, 1.8, 2.5, and the like.

Various examples of polyepoxides that may be used in the process of the invention are given in U. S. 2,633,458 and it is to be understood that so much of the disclosure of that patent relative to examples of polyepoxides is incorporated by reference into this specification.

The glycidyl polyethers of polyhydric phenols obtained by condensing the polyhydric phenols with epichlorohydrin as described in U. S. 2,633,458 are also referred to as "ethoxyline" resins. See Chemical Week, vol. 69, page 27, for September 8, 1951.

A group of polyepoxides not specifically illustrated in the above-noted patent comprise the glycidyl ethers of novalac resins which resins are obtained by condensing an aldehyde with a polyhydric phenol. A typical member of this class is the epoxy resin from formaldehyde 2,2-bis(4-hydroxyphenyl) propane novalac resin which contains as predominant constituent the substance represented by the formula

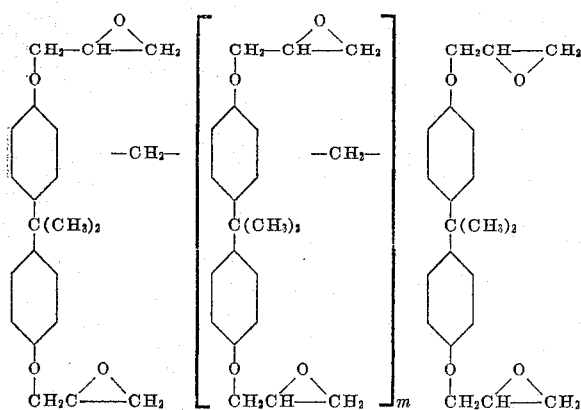

wherein $m$ is a value of at least 1.0. For the nature and preparation of novalac resins, see the book by T. S. Carswell, Phenoplasts, 1947, page 29, et seq.

Another group of polyepoxides include the glycidyl polyethers of a polyhydric phenol which has two hydroxyaryl groups separated by an aliphatic chain of at least six carbon atoms in the chain and with the chain being attached by carbon-to-carbon bonding to a nuclear carbon atom of the hydroxyl aryl groups. Suitable phenols used for preparing these resins comprise those obtained by condensing phenol with a phenol having an aliphatic side chain with one or more olefinic double bonds positioned in the chain so the required separating atoms are present between two hydroxyphenol groups of the resulting polyhydric phenol. Cardanol, obtainable in known manner from cashew nut shell liquid, is a convenient source of phenols containing such side chain. Mixed grades of cardanol containing about equal amounts of m-(8-pentadecenyl) phenol and a phenol with a 15 carbon atom side chain having two double bonds similarly removed from the aromatic nucleus are available from the Irvington Varnish and Insulator Co.

Of special interest are the polyepoxides containing only elements selected from groups consisting of C, H, O and Cl.

To illustrate the manner in which the invention may be carried out, the following examples are given. It is to be understood, however, that the examples are for the purpose of illustration and the invention is not to be regarded as limited to any of the specific materials or conditions recited therein. Unless otherwise indicated, parts described in the examples are parts by weight.

*Example I*

This example illustrates the unexpectedly high rate of cure that is obtained by using maleic anhydride in combination with a $BF_3$-phenol.

40 parts of polyether A was combined with 10 parts of maleic anhydride and .0125 part of $BF_3$-phenol. This mixture gelled in 1 minute at room temperature. The same concentration of maleic anhydride in the absence of the boron trifluoride complex failed to cause gelation at room temperature, and the same concentration of $BF_3$ phenol in the absence of the anhydride took 8 minutes to gel at room temperature.

*Example II*

This example illustrates the unexpectedly high rate of cure that is obtained by using maleic anhydride in combination with $BF_3$-ethylamine.

40 parts of polyether A was combined with 10 parts of maleic anhydride and 0.25 part of $BF_3$-ethylamine pre-dissolved in 0.25 part of polyethylene glycol 400 and the mixture heated at 75° C. The mixture gelled in 20 minutes. In the absence of the $BF_3$ complex, the anhydride failed to gell the mixture after 6 hours. In the absence of the anhydride, a concentration of $BF_3$-ethylamine of 3 parts per 100 parts of polyether A required 9 hours at 100° C. for gelation.

*Example III*

This example illustrates the fast rate of cure that is obtained by using maleic anhydride in combination with $BF_3$ triethylamine.

40 parts of polyether A was combined with 10 parts of maleic anhydride and 0.25 part of $BF_3$-triethylamine pre-dissolved in 0.25 part of polyethylene glycol. The mixture thickened to a gell after 1 hour at 100° C. In the absence of the $BF_3$ complex, the anhydride failed to cause gelation after 2½ hours at 100° C. In the absence of the anhydride a concentration of 4.5 per hour of $BF_3$ triethylamine gave no perceptible thickening after 9 hours at 100° C. or 6 hours at 150° C.

*Example IV*

This example illustrates the unexpectedly fast rate of cure that is obtained by using maleic anhydride in combination with $BF_3$-benzyl dimethyl amine.

40 parts of polyether A was combined with 10 parts of maleic anhydride and 0.25 part of $BF_3$ benzyl dimethyl amine pre-dissolved in 0.25 part of polyethylene glycol 400 and the mixture heated to 100° C. The mixture gelled in 1 hour and 20 minutes at this temperature. In the absence of the $BF_3$ complex, the anhydride did not cause gelation, even after 2½ hours at 100° C., and in the absence of the anhydride, a concentration of $BF_3$-benzyldimethylamine of 5.2 parts per 100 parts of polyether A would not gel in 5 hours at 150° C.

Related results are obtained by replacing the $BF_3$ benzyl dimethyl amine complex in the above process with equivalent amounts of each of the following: $BF_3$ tripropyl amine, $BF_3$ lauryl amine, $BF_3$ hexanol amine, $BF_3$ diethylene triamine and $BF_3$ amyl amine.

*Example V*

This example illustrates the fast rate of cure that is obtained by using maleic anhydride in combination with $BF_3$ n-butylamine.

40 parts of polyether A was combined with 10 parts of maleic anhydride and 0.5 part BF$_3$ n-butylamine complex dissolved in 0.5 part of polyethylene glycol. This mixture gelled in 5 minutes at 100° C.

*Example VI*

This example illustrates the fast rate of cure that is obtained by using maleic anhydride in combination with BF$_3$-aniline.

24 parts of maleic anhydride was dissolved in 48 parts of polyether A with heat. The mixture was allowed to cool, and 2 parts of a 40% solution of BF$_3$-aniline in polyethylene glycol-400 was added. The mixture gelled at room temperature in 2 minutes.

*Example VII*

Example V was repeated with the exception that polyether B was used in place of polyether A. In this case the mixture also gelled in a few minutes at 100° C.

*Example VIII*

This example illustrates the fast rate of cure that is obtained by using phthalic anhydride in combination with BF$_3$-hexamethylene tetraamine.

25 parts of polyether D was combined with 8 parts of phthalic anhydride and .1 part of BF$_3$ hexamethylene tetraamine and the mixture heated to 150° C. The mixture gelled in 1 hour and 20 minutes.

Related results are obtained by replacing polyether D in the above process with equal amounts of polyether A and polyether B.

*Example IX*

This example illustrates the fast rate of cure that is obtained by using phthalic anhydride in combination with BF$_3$-ammonia.

25 parts of polyether D was combined with 8 parts of phthalic anhydride and .1 part of BF$_3$-ammonia and the mixture heated to 150° C. The mixture gelled in 1 hour and 5 minutes at this temperature.

Related results are obtained by replacing polyether D in the above process with equal amounts of polyether A and polyether B.

*Example X*

This example illustrates the fast rate of cure that is obtained by using phthalic anhydride in combination with BF$_3$-piperidine.

25 parts of polyether D was combined with 8 parts of phthalic anhydride and .1 part of BF$_3$ piperidine and the mixture heated at 150° C. This mixture gelled in 40 minutes at this temperature.

Related results are obtained by replacing polyether D in the above process with equal amounts of polyether A and polyether B.

*Example XI*

This example illustrates the fast rate of cure that is obtained by using phthalic anhydride in combination with BF$_3$-ethylamine.

25 parts of polyether D was combined with 8 parts of phthalic anhydride and .1 part of BF$_3$ ethylamine and the mixture heated to 140° C. This mixture gelled in 40 minutes at this temperature.

Related results are obtained by replacing polyether D in the above process with equal amounts of polyethers D, B and E.

*Example XII*

This example illustrates the fast rate of cure that is obtained by using phthalic anhydride in combination with BF$_3$-urea.

25 parts of polyether D was combined with 8 parts of phthalic anhydride and .1 part of BF$_3$-urea and the mixture heated to 150° C. This mixture gelled in 1 hour and 45 minutes at 150° C.

*Example XIII*

191 parts of polyether A, 154 parts of hexahydrophthalic anhydride and 1.9 parts of BF$_3$-ethylamine are mixed together and the mixture placed in a tin cup and heated to 100° C. The mixture set up very rapidly to form a light yellow casting.

Similar results are obtained by replacing the BF$_3$-aniline with equal amounts by weight of each of the following: BF$_3$-ethylamine, BF$_3$-pyridine, and BF$_3$-urea, BF$_3$-diethyl aniline, BF$_3$-dimethyl aniline, and BF$_3$-morpholine.

*Example XIV*

191 parts of polyether F, 168 parts of dichloromaleic anhydride and 0.5 part of BF$_3$ phenol pre-dissolved in 10 parts of polyethylene glycol having a mol, wt. of 400 are mixed together and placed in a tin cup. The cup is heated at 100° C. and in a few minutes the mixture sets up to a very hard casting.

Related results are obtained by replacing the dichloromaleic acid anhydride in the above process with equivalent amounts of each of the following: chlorosuccinic anhydride and dodecylsuccinic anhydride.

*Example XV*

60 parts of dodecenyl succinic anhydride was mixed with 40 parts of polyether A and 1 part of BF$_3$-ethyl aniline added. The mixture gelled in 20 minutes at 80° C. The same system without the BF$_3$ ethyl aniline did not gell even after 4 hours at 80° C.

I claim as my invention:

1. A process for resinifying and curing a polyepoxide having a 1,2-epoxy equivalency of at least 1.1 which comprises mixing and reacting the polyepoxide with a polycarboxylic acid anhydride and an activator therefor comprising the addition product of BF$_3$ and a member of the group consisting of the amines and phenols.

2. The resinous product obtained according to the process of claim 1.

3. A process for producing a resinified product which comprises mixing and reacting a polyepoxide having a 1,2-epoxy equivalency of at least 1.1 with at least .8 equivalent of a polycarboxylic acid anhydride and from .01% to 10% by weight of the resin of an activator for the anhydride comprising the addition product of BF$_3$ and a member of the group consisting of amines and phenols.

4. A process as in claim 3 wherein the polyepoxide is a glycidyl polyether of a polyhydric phenol having a 1,2-epoxy equivalency between 1.1 and 2.0 and a molecular weight between 200 and 900.

5. A process as in claim 3 wherein the polyepoxide is a glycidyl polyether of a polyhydric alcohol having a 1,2-epoxy equivalency between 1.1 and 3 and a molecular weight between 170 and 800.

6. A process as in claim 3 wherein the anhydride is an aliphatic hydrocarbon polycarboxylic anhydride.

7. A process as in claim 3 wherein the anhydride is an aromatic hydrocarbon dicarboxylic acid anhydride.

8. A process as in claim 3 wherein the activator is a BF$_3$-amine.

9. A process as in claim 3 wherein the activator is a BF$_3$-phenol.

10. A process as in claim 3 wherein the activator is BF$_3$-ethylamine.

11. A process as in claim 3 wherein the activator is BF$_3$-benzyl dimethyl amine.

12. A process as in claim 3 wherein the activator is BF$_3$-triethylamine.

13. A process as in claim 3 wherein the activator is BF$_3$-hexamethylene tetraamine.

14. A process as in claim 3 wherein the polyepoxide is a glycidyl ether of 2,2-bis(4-hydroxyphenyl)propane.

15. A process as in claim 3 wherein the anhydride is maleic anhydride.

16. A process as in claim 3 wherein the anhydride is phthalic anhydride.

17. A process as in claim 3 wherein the anhydride is 3,4,5,6,7,7 - hexachloro - 3,6 - endomethylene - 1,2,4,5-tetrahydrophthalic anhydride.

18. A process as in claim 3 wherein the anhydride is dichloromaleic anhydride.

19. A curable composition comprising a mixture of a polyepoxide having a

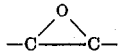

equivalency greater than 1.1, a polycarboxylic acid anhydride and an activator therefor comprising the addition product of $BF_3$ and a member of the group consisting of amines and phenols.

20. A composition as in claim 19 wherein the activator is a $BF_3$-amine.

References Cited in the file of this patent

UNITED STATES PATENTS 2,528,932     Wiles et al. _____ Nov. 7, 1950

FOREIGN PATENTS 133,819     Australia _____ Aug. 10, 1949